US007848338B2

(12) United States Patent
Bachmutsky

(10) Patent No.: US 7,848,338 B2
(45) Date of Patent: Dec. 7, 2010

(54) NETWORK-BASED RELIABILITY OF MOBILITY GATEWAYS

(75) Inventor: Alexander Bachmutsky, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 203 days.

(21) Appl. No.: 11/588,373

(22) Filed: Oct. 27, 2006

(65) Prior Publication Data
US 2008/0101314 A1 May 1, 2008

(51) Int. Cl.
*H04L 12/28* (2006.01)
(52) U.S. Cl. .................. 370/401; 370/338; 370/242; 455/453; 455/41.2; 455/445; 455/466
(58) Field of Classification Search .......... 455/453, 455/560, 445, 41.2; 370/338, 328, 401; 709/203–206
See application file for complete search history.

(56) References Cited

U.S. PATENT DOCUMENTS

| 6,081,591 | A  | * | 6/2000  | Skoog ........................ 379/230 |
| 6,215,782 | B1 | * | 4/2001  | Buskens et al. ............. 370/350 |
| 6,219,546 | B1 | * | 4/2001  | Valentine et al. ........... 455/428 |
| 6,292,463 | B1 | * | 9/2001  | Burns et al. ................. 370/216 |
| 6,542,491 | B1 | * | 4/2003  | Tari et al. ................... 370/338 |
| 6,704,795 | B1 | * | 3/2004  | Fernando et al. ........... 709/237 |
| 6,788,938 | B1 | * | 9/2004  | Sugaya et al. ............. 455/435.1 |
| 6,859,448 | B1 | * | 2/2005  | Roy ........................... 370/338 |
| 6,961,575 | B2 | * | 11/2005 | Stanforth ................... 455/445 |
| 7,054,308 | B1 | * | 5/2006  | Conway ..................... 370/356 |
| 7,103,002 | B2 | * | 9/2006  | Bjelland et al. ............. 370/242 |
| 7,433,362 | B2 | * | 10/2008 | Mallya et al. ............... 370/408 |
| 7,474,650 | B2 | * | 1/2009  | O'Neill ...................... 370/349 |
| 7,593,718 | B2 | * | 9/2009  | Gorday et al. ............. 455/412.1 |
| 7,680,073 | B2 | * | 3/2010  | Jamieson et al. ........... 370/328 |
| 7,733,885 | B2 | * | 6/2010  | Ayyagari et al. ........... 370/401 |
| 7,761,087 | B2 | * | 7/2010  | Kharia et al. ............. 455/414.1 |
| 2001/0055285 | A1 |   | 12/2001 | Tomoike |
| 2004/0215750 | A1 | * | 10/2004 | Stilp ......................... 709/220 |
| 2006/0015586 | A1 | * | 1/2006  | Sharma et al. ............. 709/220 |
| 2006/0206597 | A1 | * | 9/2006  | Kim et al. ................... 709/220 |
| 2006/0234678 | A1 | * | 10/2006 | Juitt et al. ................... 455/411 |
| 2007/0140112 | A1 | * | 6/2007  | Osterhout et al. .......... 370/225 |

(Continued)

FOREIGN PATENT DOCUMENTS

EP        1 515 484  A1     3/2005

(Continued)

OTHER PUBLICATIONS

International Search Report, PCT/IB2007/053595 filed Oct. 27, 2006.

*Primary Examiner*—Sharad Rampuria
(74) *Attorney, Agent, or Firm*—Mintz, Levin, Cohn, Ferris, Glovsky and Popeo, P.C.

(57) ABSTRACT

A gateway node provides an interface connectivity between communication networks. The gateway node is configured to be operably connected to another gateway node as well as to a base station providing connectivity for a plurality of mobile terminals over a radio interface. Further, the gateway node is configured to send a first peer status report message indicating the respective status of a group of functions of the gateway node which are predetermined to be vital to an application connectivity over the gateway node of selected ones of said plurality of mobile terminals. The first peer status report message is sent periodically.

26 Claims, 3 Drawing Sheets

U.S. PATENT DOCUMENTS

| | | | |
|---|---|---|---|
| 2007/0245025 A1* | 10/2007 | Venkatachalam | 709/226 |
| 2007/0253351 A1* | 11/2007 | Oswal | 370/328 |
| 2008/0081625 A1* | 4/2008 | Ergen et al. | 455/436 |
| 2008/0310347 A1* | 12/2008 | Morishige et al. | 370/328 |
| 2009/0003296 A1* | 1/2009 | Zheng | 370/338 |
| 2009/0111458 A1* | 4/2009 | Fox et al. | 455/422.1 |

FOREIGN PATENT DOCUMENTS

| | | |
|---|---|---|
| EP | 1 670 273 | 6/2006 |
| WO | WO 00/69148 | 11/2000 |

* cited by examiner

NETWORK-BASED RELIABILITY OF MOBILITY GATEWAYS

FIELD OF THE INVENTION

The present invention relates to a gateway node, a base station, a system and a method for providing reliability of the functionality of mobility gateways on a network basis.

RELATED BACKGROUND ART

In recent years, the resiliency of mobility gateways became a very important requirement for practically every operator. The main reason is that broadband gateways in mobile networks are usually responsible for the connectivity of a very large number of terminals—from hundreds of thousands to millions. Failure of such a gateway causes all those subscribers to disconnect and in the best case to try to reconnect quickly. In the worst case, they will be waiting for an application to timeout before that.

Apparently, such behavior of the network is highly undesirable. There are multiple ways to handle resiliency. An immediate one is to protect some vital hardware resources. It starts with fans and power supplies, continues to external ports protection, and some complex implementation provides the entire computing platform protection either internally with e.g. blades protecting other blades in the chassis, or externally with one network element protecting one or more other network elements.

In many cases it is expensive and complex from both software and hardware perspective to include a built-in redundancy for all components. Hence, usually only a redundancy for power supply and fans is provided which are components with a lowest mean time between failure. However, this does not provide a solution against the most common network element failure which is caused by software.

With respect thereto, there are multiple implementations known in different fields for stateful redundancy, all of them are very complex. Some are placed in the field of routing space with non-stop routing and non-stop forwarding, thus achieving a full state recovery after a failure. Others are strictly application-dependent, like a stateful database replication.

One well-known example of a network-based redundancy is the virtual router redundancy protocol (VRRP) to be implemented in routers. Unfortunately, VRRP was not designed to protect against a failure in the reachability of internal network element addresses, but only for addresses external to redundant devices. A description of the VRRP can be found e.g. in the RFC3768 of the Internet Engineering Task Force.

SUMMARY OF THE INVENTION

Hence, there is a need for a simpler and more inexpensive solution for mobility gateway resiliency.

Therefore, it is an object of the present invention to overcome the shortcomings of the prior art.

Specifically, according to a first aspect of the present invention, there is provided a gateway node for providing an interface connectivity between communication networks, wherein the gateway node is configured to be operably connected to another gateway node as well as to a base station providing connectivity for a plurality of mobile terminals over a radio interface; and send a first peer status report message indicating the respective status of a group of functions of the gateway node which are predetermined to be vital to an application connectivity over the gateway node of selected ones of said plurality of mobile terminals, wherein the first peer status report message is sent periodically.

Advantageous modifications of the first aspect are that the gateway node is further configured to receive a second peer status report message indicating the respective status of a group of functions of the another gateway node which are predetermined to be vital to an application connectivity over the another gateway node of other selected ones of said plurality of mobile terminals; and to send a base station report message to the base station indicating the status of the another gateway node in case the status of the another gateway node has changed according to a changed indication within two consecutively received second peer status report messages, wherein the peer second status report message is received periodically.

Further, the gateway node may be further configured to consider the absence of a second peer status report message within the periodicity of its receipt as the receipt of a second peer status report message indicating a function failure.

The group of functions may comprise one or more of the following: user plane forwarding, internet protocol forwarding, foreign agent, authenticator, paging, datapath.

The gateway node may also be further configured to exchange state information messages with said another gateway node indicating states at least selected from the group of authentication and encryption keys, as well as mobile internet protocol registrations.

According to a second aspect of the present invention, there is provided a base station for providing connectivity for selected ones of a plurality of mobile terminals to a communication network over a radio interface, wherein the base station is configured to be operably connected to first and second gateway nodes as well as to said plurality of mobile terminals; and receive a base station report message indicating a status of the first gateway node, wherein the status is either failed or recovered.

Advantageous modifications are that the base station is further configured to trigger a full communication network re-entry of the selected ones of the plurality of mobile terminals in case the status of the first gateway node has changed according to a changed indication within two consecutively received base station report messages, wherein the full communication network re-entry involves a gateway node selection for serving the plurality of mobile terminals, and wherein the first gateway node is only considered for selection if its currently indicated status is recovered.

Further, the base station may be further configured to trigger those mobile terminals out of the selected ones of the plurality of mobile terminals which are actively exchanging data in case of an indicated failed status of the first gateway node with a higher priority, and in case of an indicated recovered status of the first gateway node with lower priority.

Alternatively, the base station may be further configured to trigger a full communication network re-entry of active mobile terminals of the selected ones of the plurality of mobile terminals in case the status of the first gateway node has changed according to a changed indication within two consecutively received base station report messages, wherein the full communication network re-entry involves a gateway node selection for serving the active mobile terminals, and wherein the first gateway node is only considered for selection if its currently indicated status is recovered.

Still alternatively, the base station may be further configured to trigger a partial communication network re-entry of the selected ones of the plurality of mobile terminals in case the status of the first gateway node has changed according to a changed indication within two consecutively received base station report messages, wherein the partial communication network re-entry involves a gateway node selection for serving the plurality of mobile terminals, wherein the first gateway node is only considered for selection if its currently indicated status is recovered, and wherein state information present at said second gateway node is utilized for the communication network re-entry with said state information being at least selected from the group of authentication and encryption keys, as well as mobile internet protocol registrations.

According to a third aspect of the present invention, there is provided a system for providing a gateway node resiliency within a communication network, comprising: a plurality of gateway nodes for providing an interface connectivity between communication networks; and a plurality of base stations for providing connectivity for selected ones of a plurality of mobile terminals to a communication network over a radio interface, wherein each of the gateway nodes is configured to be operably connected with each of the base stations and vice versa, respectively, and each of the gateway nodes is configured to periodically send a peer status report message indicating its status, the status being either failed or recovered.

Advantageous modifications are that the system is configured to consider the absence of a peer status report message within the periodicity of its sending as the sending of a peer status report message indicating a failure status.

Further, each of the gateway nodes may be further configured to send the peer status report message to at least another gateway node, to receive the peer status report message from at least said another or still another gateway node, and to send a base station report message to each of the plurality of base stations indicating the status of the said another or still another gateway node, in case the status of the said another or still another gateway node has changed according to a changed indication within two consecutively received peer status report messages.

Still further, the system may further comprise a plurality of mobile terminals, wherein each of the base stations is configured to assign a mobile terminal which is connected to it via the radio interface upon communication network entry to a selected gateway node.

Moreover, each of the base stations may be configured to trigger a full communication network re-entry of a mobile terminal which is connected to it via the radio interface in case the status of any one of the plurality of gateway nodes has changed according to a changed indication within two consecutively received base station report messages, and the full communication network re-entry involves a gateway node selection for serving each of the plurality of mobile terminals, with a gateway node only being considered for selection if its currently indicated status is recovered.

In this case, each of said base stations may be further configured to trigger those mobile terminals out of the selected ones of the plurality of mobile terminals which are actively exchanging data in case of an indicated failed status of the first gateway node with a higher priority, and in case of an indicated recovered status of the first gateway node with lower priority.

Alternatively, each of the base stations may be configured to trigger a full communication network re-entry of an active mobile terminal which is connected to it via the radio interface in case the status of any one of the plurality of gateway nodes has changed according to a changed indication within two consecutively received base station report messages, and the full communication network re-entry involves a gateway node selection for serving each active mobile terminal, with a gateway node only being considered for selection if its currently indicated status is recovered.

Still alternatively, each of the gateway nodes may be further configured to exchange state information messages with at least another gateway node indicating state information at least selected from the group of authentication and encryption keys, as well as mobile internet protocol registrations, and each of the base stations may be further configured to trigger a partial communication network re-entry of the selected ones of the plurality of mobile terminals in case the status of any one of the plurality of gateway nodes has changed according to a changed indication within two consecutively received base station report messages, wherein the partial communication network re-entry involves a gateway node selection for serving the plurality of mobile terminals, with a gateway node only being considered for selection if its currently indicated status is recovered, and wherein state information present at each of the gateway nodes which are not in failed status is utilized for the communication network re-entry.

According to a fourth aspect of the present invention, there is provided a method of providing a gateway node resiliency within a communication network, comprising: providing an interface connectivity between communication networks by a plurality of gateway nodes; providing connectivity for selected ones of a plurality of mobile terminals to a communication network over a radio interface by each of a plurality of base stations; operably connecting each of the gateway nodes with each of the base stations and vice versa, respectively; and periodically sending a peer status report message by each of the gateway nodes indicating its status, the status being either failed or recovered.

In a modification, the absence of a peer status report message within the periodicity of its sending may be considered as the sending of a peer status report message indicating a failure status.

Further advantageous modifications are that the peer status report message is sent to at least another gateway node, wherein the method may further comprise: receiving the peer status report message from at least said another or still another gateway node; and sending a base station report message to each of the plurality of base stations indicating the status of the said another or still another gateway node, in case the status of the said another or still another gateway node has changed according to a changed indication within two consecutively received peer status report messages.

Further, the method may further comprise assigning upon communication network entry each of a plurality of mobile terminals by a base station to which it is connected via the radio interface to a selected gateway node.

Still further, the method according may further comprise: triggering by each of the base stations a full communication network re-entry of a mobile terminal which is connected to it via the radio interface in case the status of any one of the plurality of gateway nodes has changed according to a changed indication within two consecutively received base station report messages, and involving a gateway node selection by the full communication network re-entry for serving each of the plurality of mobile terminals, wherein a gateway node is only considered for selection if its currently indicated status is recovered.

In this case, said triggering may include triggering those mobile terminals out of the selected ones of the plurality of mobile terminals which are actively exchanging data in case of an indicated failed status of the first gateway node with a higher priority, and in case of an indicated recovered status of the first gateway node with lower priority.

Alternatively, the method according may further comprise: triggering by each of the base stations a full communication network re-entry of an active mobile terminal which is connected to it via the radio interface in case the status of any one of the plurality of gateway nodes has changed according to a changed indication within two consecutively received base station report messages, and involving a gateway node selection by the full communication network re-entry for serving each active mobile terminal, wherein a gateway node is only considered for selection if its currently indicated status is recovered.

Still alternatively, the method may further comprise: exchanging by each of the gateway nodes state information messages with at least another gateway node indicating state information at least selected from the group of authentication and encryption keys, as well as mobile internet protocol registrations, triggering by each of the base stations a partial communication network re-entry of the selected ones of the plurality of mobile terminals in case the status of any one of the plurality of gateway nodes has changed according to a changed indication within two consecutively received base station report messages, involving a gateway node selection by the partial communication network re-entry for serving the plurality of mobile terminals, with a gateway node only being considered for selection if its currently indicated status is recovered, and re-entering the communication network by the selected ones of the plurality of mobile terminals, wherein state information present at each of the gateway nodes which are not in failed status is utilized.

According to a fifth aspect of the present invention, there is provided a gateway node for providing an interface connectivity between communication networks, comprising: means for operably connecting to another gateway node as well as to a base station providing connectivity for a plurality of mobile terminals over a radio interface; and means for sending a first peer status report message indicating the respective status of a group of functions of the gateway node which are predetermined to be vital to an application connectivity over the gateway node of selected ones of said plurality of mobile terminals, wherein the first peer status report message is sent periodically.

According to a sixth aspect of the present invention, there is provided a base station for providing connectivity for selected ones of a plurality of mobile terminals to a communication network over a radio interface, comprising: means for operably connecting to first and second gateway nodes as well as to said plurality of mobile terminals; and means for receiving a base station report message indicating a status of the first gateway node, wherein the status is either failed or recovered.

According to a seventh aspect of the present invention, there is provided a system for providing a gateway node resiliency within a communication network, comprising: a plurality of gateway node means for providing an interface connectivity between communication networks; and a plurality of base station means for providing connectivity for selected ones of a plurality of mobile terminal means to a communication network over a radio interface, wherein each of the gateway node means is configured to be operably connected with each of the base station means and vice versa, respectively, and each of the gateway node means is configured to periodically send a peer status report message indicating its status, the status being either failed or recovered.

According to an eighth aspect of the present invention, there is provided a computer program product comprising instructions which are operable to control a data processor, the instructions including: to provide an interface connectivity between communication networks by a plurality of gateway nodes; to provide connectivity for selected ones of a plurality of mobile terminals to a communication network over a radio interface by each of a plurality of base stations; to operably connect each of the gateway nodes with each of the base stations and vice versa, respectively; and to periodically send a peer status report message by each of the gateway nodes indicating its status, the status being either failed or recovered.

BRIEF DESCRIPTION OF THE DRAWINGS

The above and further aspects, features, and advantages of the present invention will become readily apparent from the following description of its preferred embodiments which is to be taken in conjunction with the appended drawings, in which.

PREFERRED EMBODIMENTS OF THE PRESENT INVENTION

The preferred embodiments described in the following serve to illustrate the applicability and enablement of the present invention, but it is to be expressly understood that these embodiments are meant to serve as illustrative examples only, and that they are by no means to be construed as limiting the present invention to the described particularities.

According to an embodiment of the present invention, two or more gateways maintain a health management between themselves over the network as network-based redundancy. All base stations (BS) are simultaneously connected to multiple mobility gateways (GW) concurrently as an active-active redundancy principle, i.e. the mobile gateways are protecting each other, while being active at the same time in contrast to a active-standby redundancy principle where an active element would be protected by another element in standby. Thus, the redundancy is not done at network element level by adding duplicating hardware. Instead the redundancy is done at network level. Also, all functioning mobility gateways are actively processing traffic (management, control and user planes) at all times, hence the scheme is active-active. That is, all these base stations and mobility gateways form a so called resiliency domain. Furthermore, mobile terminal load balancing is performed by all base stations for gateway selection when a mobile terminal enters the resiliency domain for the first time. When one of gateways is considered failed/recovered by its peers, all relevant base stations are notified and adjust their gateway selection.

While the present invention is not intended to be limited by the specific network type, a proposed implementation embodiment as one of all possible embodiments of the present invention relates to a WiMAX (worldwide interoperability for microwave access) mobility gateway called access service network gateway (ASN-GW). It is to be noted for preciseness, that the relation to WiMAX intends to designate WirelessMAN (wireless metropolitan area network) technology according to the 802.16 standard or one of its derivates as issued by the institute of electrical and electronics engineers (IEEE).

Figure 1:
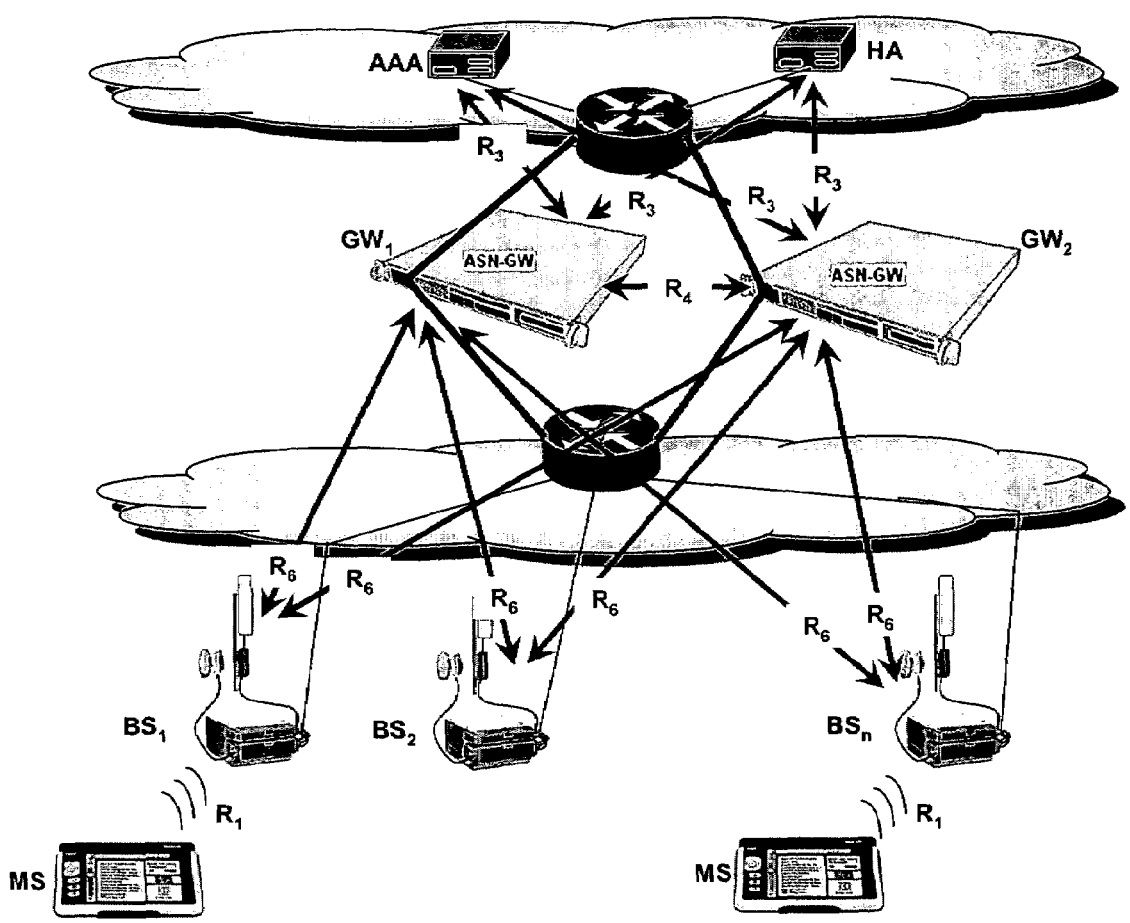
FIG. 1 shows a network diagram with redundant access service network gateways according to an embodiment of the present invention.

A network diagram for a proposed resilient network deployment according to this embodiment is presented in FIG. 1.

Regarding a gateway node ($GW_1$, $GW_2$), a base station ($BS_1$, $BS_2$, $BS_n$), a system and a method, the present embodiment involves the following.

During the initial network entry or full network re-entry of a mobile station (MS) as an example of a mobile terminal, corresponding serving base stations ($BS_1$, $BS_2$, $BS_n$) will select one of a group of access service network gateways (ASN-GW) such as $GW_1$ or $GW_2$ to serve this particular MS. The algorithm to be used for such a selection can be as simple as a strict round robin or based on some intelligent network resource optimization. For overview purposes, FIG. 1 also illustrates a connection to a core network including elements such as an authentication, authorization and accounting (AAA) server, and a home agent (HA) server.

Figure 2:
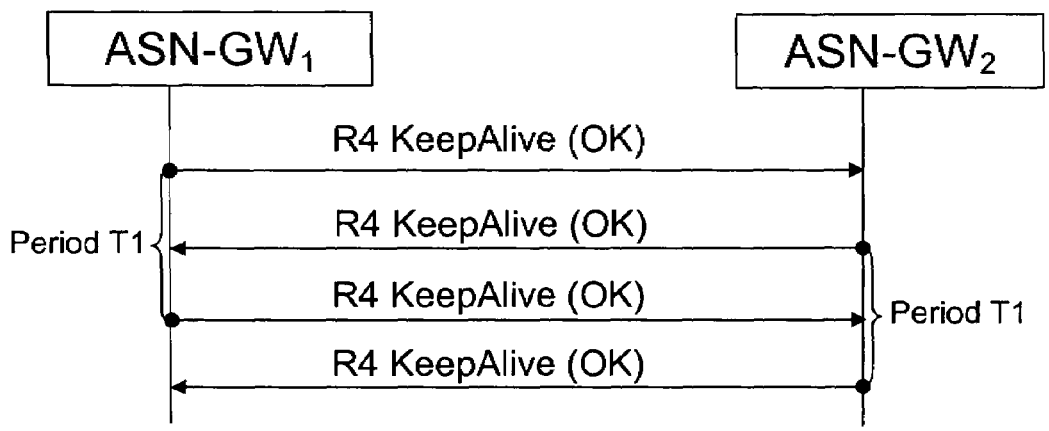
FIG. 2 shows the signaling between network gateways for exchanging keep-alive information.

Referring to FIG. 2, a specific embodiment of the present invention involves that a "R4 keepalive" message (R4 KeepAlive (OK)) is exchanged periodically (Period T1), for example, every 100 ms, between the access service network gateways ($ASN-GW_1$, $ASN-GW_2$) including a bitmap of the health state for every function of the gateway. A list of examples for the functions includes: user plane forwarding, IP (internet protocol) forwarding, foreign agent, authenticator, paging, datapath.

As a simplification of that algorithm, the bitmap can be replaced by a just aggregated status report (OK/FAIL). A failure to receive this message from a configured redundant peer for a configured period of time is equal to the report of a FAIL state. It is to be noted that such messages will use a virtual IP address in both access service network gateways ($ASN-GW_1$, $ASN-GW_2$) to ensure a layer 3 (L3) connectivity in the case when one of the physical ports failed, but there is an alternate path through different port(s).

While the above described embodiments relate to a pure handling by access service network gateways (ASN-GW), it is considered that the recovery time for all subscriber sessions can be shortened if the base stations are involved in the process.

Thus, the embodiments described in the following involve some cooperation from the base stations (BS) and a special protocol between the base stations (BS) and the mobility gateways.

Figure 3:
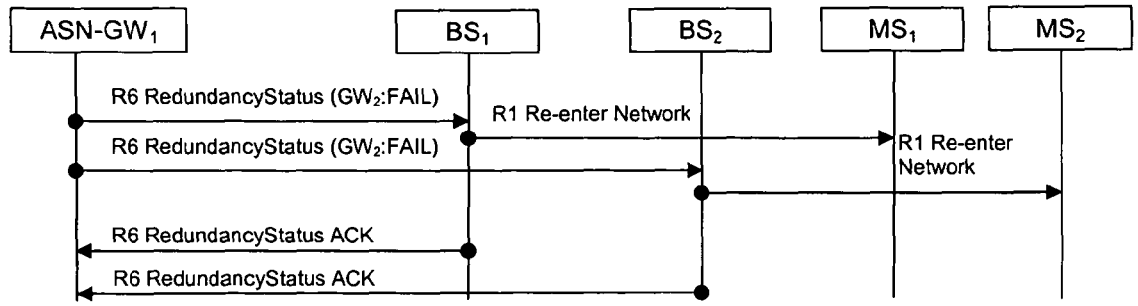
FIG. 3 shows an example of signaling flow illustrating the principle of a network re-entry of mobile stations as triggered by a network gateway and base stations.

Referring to FIG. 3, a "R6 RedundancyStatus" message is sent to all base stations (BS) in the resiliency domain in the case of a state change of an access service network gateway (ASN-GW). It includes an identification and the state (failed/recovered) of the access service network gateway (ASN-GW) concerned. FIG. 3 depicts the case where access service network gateway $ASN-GW_1$ has discovered a failure of access service network gateway $ASN-GW_2$ and reports the same to the base stations $BS_1$ and $BS_2$.

Preferably, upon receipt of the FAIL (failed) state, a respectively informed base station ($BS_1$, $BS_2$) triggers a full network re-entry to all served mobile stations ($MS_1$, $MS_2$) in any state (active or idle) that were assigned by a load balancing algorithm as e.g. mentioned above to the failed access service network gateway ($ASN-GW_2$). Such a trigger is supported by the present standards which allow the terminal wake-up from idle state when any data come to the terminal. Thus, the trigger minimizes the time when the mobile station (MS) does not have network connectivity, because a new network entry will happen through another (functioning) access service network gateway (ASN-GW). Subscriber sessions which are not very sensitive will survive such failure of an access service network gateway (ASN-GW).

A similar procedure can also be done, when the concerned access service network gateway ($ASN-GW_2$) is recovered again.

Figure 4:
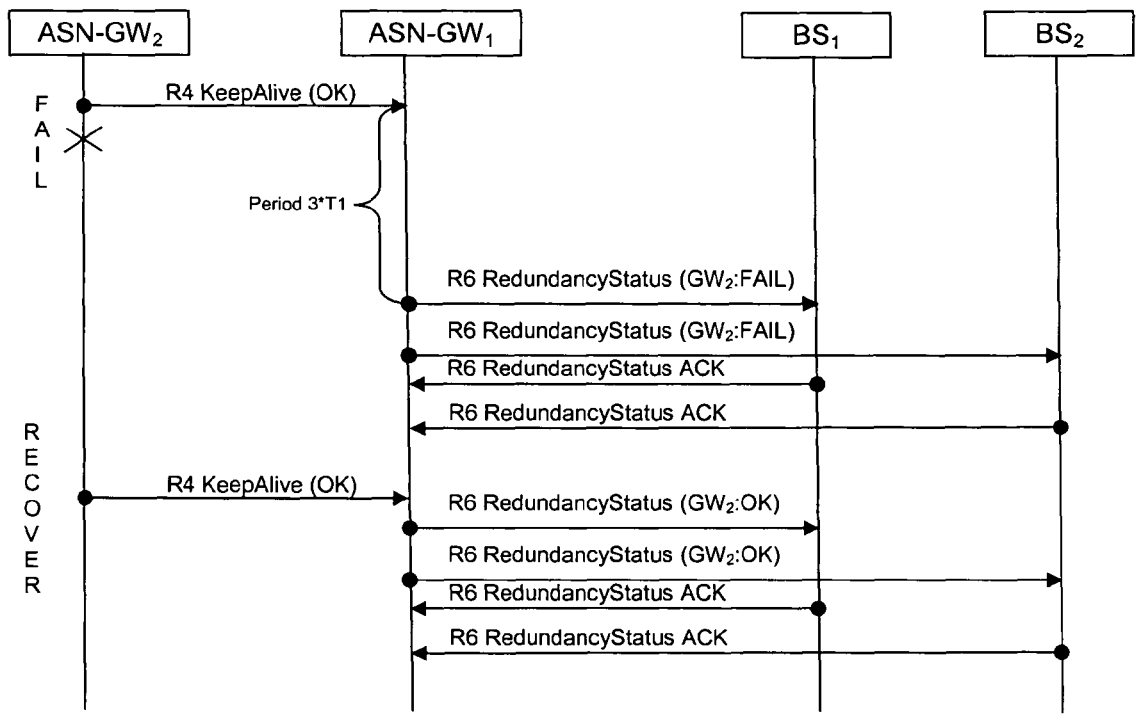
FIG. 4 shows an example of signaling flow in case of losing R4 KeepAlive signaling.
Figure 5:
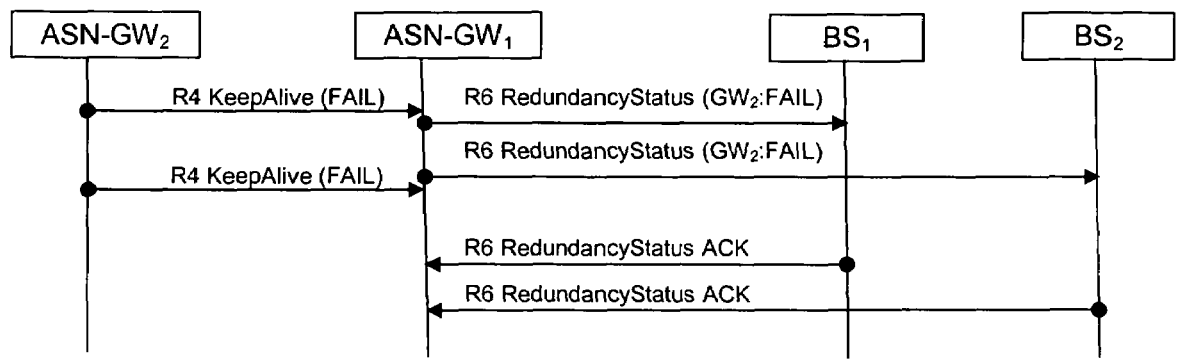
FIG. 5 shows an example of signaling flow in case of network gateway receiving a R4 KeepAlive signaling indicating the failure of network gateway.

FIGS. 4 and 5 provide an overview for the state change report to the base stations.

Specifically, the top of FIG. 4 shows the above described case, where the access service network gateway $ASN-GW_1$ takes notice of a failure of the access service network gateway $ASN-GW_2$, since no status report message (R4 KeepAlive (OK)) was received within a configured time period. This configured time period could be some period of three times T1 (see FIG. 2). Accordingly, as described above in connection with FIG. 3, the access service network gateway $ASN-GW_1$ reports the same to the base stations $BS_1$ and $BS_2$ (R6 RedundancyStatus ($GW_2$: FAIL)).

FIG. 5 illustrates the above indicated alternative thereto, i.e. that the failure involving access service network gateway $ASN-GW_2$ actually sends a respective status report message (R4 KeepAlive (FAIL)) to the access service network gateway $ASN-GW_1$ which in turn informs the base stations $BS_1$, $BS_2$ (R6 RedundancyStatus ($GW_2$: FAIL)).

Following either alternative may be the case that the failure involving access service network gateway $ASN-GW_2$ is recovered again, which is illustrated at the bottom of FIG. 4. The access service network gateway $ASN-GW_2$ simply sends another status report message to its peer, the access service network gateway $ASN-GW_1$. According to the above explanations, the access service network gateway $ASN-GW_1$ thus detects a status change of the access service network gateway $ASN-GW_1$ and reports to the base stations $BS_1$, $BS_2$ (R6 RedundancyStatus ($GW_2$: OK))

After any state change report, the above described triggering mechanism regarding the mobile stations can be effected.

Some networks allow full and partial triggers. For example, there could be triggers that require full or partial network entry. If mobile gateways exchange some infrequent information between them, it can ease the case for full network entry requirement.

That is, the exchange of some state information (for example, authentication and encryption keys, Mobile IP registration, etc.) will enable a simplified network re-entry (for example, without re-authentication and MIP registration).

Figure 6:
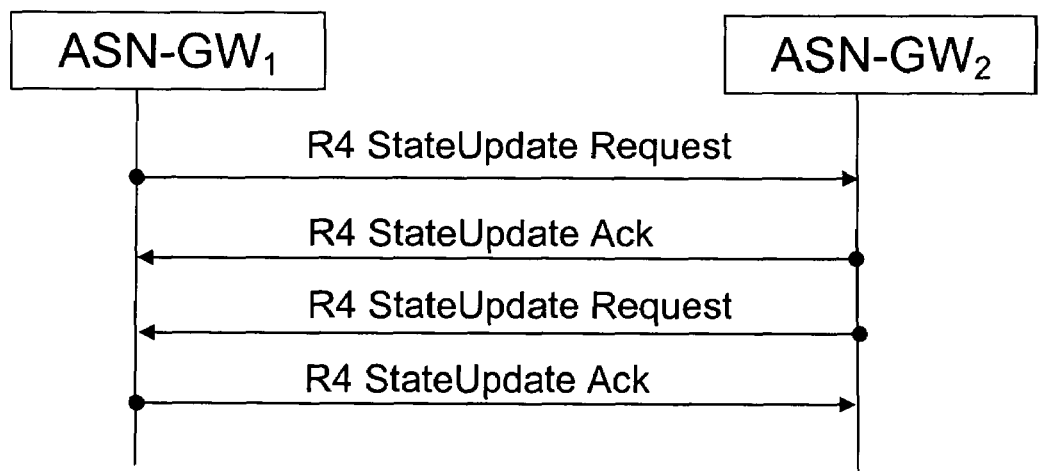
FIG. 6 shows an example of signaling flow in case of some state exchanges between mobility gateways.

This is illustrated by FIG. 6, which shows an "R4 StateUpdate Request" and corresponding "R4 StateUpdate Ack" which are exchanged between mobility gateways willing to share some of their states. As described above, usually such states would be infrequently changing states, like authentication and encryption information, Mobile IP registrations, etc.

Further embodiments are to pace such MS triggers for active terminals thus having a smaller interval between them to ease the system load, while the triggering of idle mobile stations (MS) involves larger intervals between the triggers, while considered as being not that urgent.

As an additional embodiment, MS triggers could be applied with higher priority for terminals actively exchanging data in case of ASN-GW failure (to minimize application recovery time) and with lower priority for terminals actively exchanging data in the case when ASN-GW recovers (not to disrupt working terminals).

With one more embodiment, in some networks (WiMAX is one example) it could be possible not to trigger idle terminals at all, because at the time of wake-up there will be no existing encryption key for radio network, and such terminals will be forced to perform full network entry. The advantage is that such network entry will be statistically distributed over long period of time. This will ease system load significantly, because usually number of idle terminals is much higher than amount of active ones.

The implementation embodiments above are explained for two access service network gateways (ASN-GW) protecting each other as a 1:1 redundancy, but these can be easily extended to the case of M:N redundancy, where M access service network gateways (ASN-GW) protect N access service network gateways (ASN-GW) in the network.

Thus, the above described embodiments achieve a simple and inexpensive solution for mobility gateway resiliency.

Thus, according to embodiments of the present invention, there is provided a gateway node which provides an interface connectivity between communication networks. The gateway node is configured to be operably connected to another gateway node as well as to a base station providing connectivity for a plurality of mobile terminals over a radio interface. Further, the gateway node is configured to send a first peer status report message indicating the respective status of a group of functions of the gateway node which are predetermined to be vital to an application connectivity over the gateway node of selected ones of said plurality of mobile terminals. The first peer status report message is sent periodically.

What has been described above is what are presently considered to be preferred embodiments of the present invention. However, as is apparent to the skilled reader, these are provided for illustrative purposes only and are in no way intended to that the present invention is restricted thereto. Rather, it is the intention that all variations and modifications be included which fall within the spirit and scope of the appended claims.

The invention claimed is:

1. An apparatus, comprising:
an interface, at a gateway node, configured to provide an interface connectivity between communication networks,
a connector, at the gateway node, configured to be operably connected to another gateway node, wherein each of the gateway node and the another gateway node are active by providing an interface connectivity between communication networks and to at least one base station that provides connectivity for a plurality of mobile terminals over a radio interface and by providing one or more peer status report messages;
a sender, at the gateway node, configured to send to the another gateway node a first peer status report message indicating a first status of a first group of predetermined functions of the gateway node, wherein the sender is configured to send one or more first peer status report messages to the another gateway node, wherein a failure of the another gateway node is determined based on an absence of one or more second peer status report messages, the absence causing an indication to be sent to the at least one base station to trigger a network reentry of one or more of the plurality of mobile terminals assigned to the another gateway node associated with the absence of the one or more second peer status report messages; and
a receiver configured to receive periodically the one or more second peer status report messages from the another gateway node to indicate a second status of the second group of predetermined functions of the another gateway node.

2. The apparatus according to claim 1, wherein the predetermined group of functions comprises one or more of the following: user plane forwarding, internet protocol forwarding, foreign agent, authenticator, paging, and a datapath.

3. The apparatus according to claim 1, further comprising an exchange unit configured to exchange state information messages with the another gateway node indicating states at least selected from the group of authentication, encryption keys, and mobile internet protocol registrations.

4. The apparatus according to claim 1, further comprising:
a determiner configured to cause the sender sending a base station report message indicating the status of said another apparatus in case the status of said another apparatus has changed according to a changed indication within two consecutively received second peer status report messages from said another apparatus, or no second peer status report message has been received from said another apparatus within a configured time period which indicates a failure status of said another apparatus, and wherein
the sender is further configured to send the base station report message to the base station.

5. An apparatus, comprising:
a first connector configured to be operably connected to a first gateway node;
a second connector configured to be operably connected to a second gateway node different from the first gateway node, wherein each of the first gateway node and the second gateway node are active, wherein the second gateway node includes a receiver configured to receive periodically one or more peer status report messages from the first gateway node to indicate a status of a group of predetermined functions of the first gateway node;
a third connector configured to be operably connected, over a radio interface, to a plurality of mobile terminals; and
a base station receiver configured to receive, by the second connector, a base station report message indicating the status of the first gateway node, wherein the status is either failed or recovered and obtained from the one or more peer status report messages, the status representative of whether there is a failure at the first gateway node, the reception of the base station report message triggering a network reentry of one or more of the plurality of mobile terminals assigned to the first gateway node.

6. The apparatus according to claim 5, further comprising a trigger unit configured to trigger a full communication network re-entry of the plurality of mobile terminals in case the status of the first gateway node has changed according to a changed indication within two consecutively received base station report messages, wherein the full communication network re-entry involves a gateway node selection for serving the plurality of mobile terminals, and wherein the first gateway node is only considered for selection if its currently indicated status is recovered.

7. The apparatus according to claim 6, wherein the trigger unit is further configured to trigger those mobile terminals out of the plurality of mobile terminals which are actively exchanging data in case of an indicated failed status of the first gateway node with a higher priority, and in case of an indicated recovered status of the first gateway node with lower priority.

8. The apparatus according to claim 5, wherein the trigger unit is further configured to trigger a full communication network re-entry of active mobile terminals of the plurality of mobile terminals in case the status of the first gateway node has changed according to a changed indication within two consecutively received base station report messages, wherein the full communication network re-entry involves a gateway node selection for serving the active mobile terminals, and wherein the first gateway node is only considered for selection if its currently indicated status is recovered.

9. The apparatus according to claim 5, wherein the trigger unit is further configured to trigger a partial communication network re-entry of the plurality of mobile terminals in case the status of the first gateway node has changed according to a changed indication within two consecutively received base station report messages, wherein the partial communication network re-entry involves a gateway node selection for serving the plurality of mobile terminals, wherein the first gateway node is only considered for selection if its currently indicated status is recovered, and wherein state information present at said second gateway node is utilized for the communication network re-entry with said state information being at least selected from the group of authentication and encryption keys, as well as mobile internet protocol registrations.

10. A system, comprising:
a plurality of gateway nodes comprising at least a first gateway node and a second gateway node different from the first gateway node configured to provide an interface connectivity between communication networks, wherein each of the first gateway node and the second gateway node are active; and
a base station comprising
a first connector configured to be operably connected to the first gateway node;
a second connector configured to be operably connected to the second gateway node;
a third connector configured to be operably connected, over a radio interface, to a plurality of mobile terminals, wherein
the first gateway node further comprises
a connector configured to be operably connected to the second gateway node and to the base station;
a sender configured to send periodically to the second gateway node a first peer status report message indicating a first status of a group of predetermined functions of the first gateway node, wherein a failure of the first gateway node is determined based on an absence of the first peer status report message, the absence causing an indication to be sent to the base station to trigger a network reentry of one or more mobile terminals assigned to the first gateway node associated with the absence; and
a receiver configured to receive periodically one or more second peer status report messages from the second gateway node to indicate a second status of the group of predetermined functions of the second gateway node.

11. The system according to claim 10, wherein
each of the gateway nodes further comprises an exchange unit configured to exchange state information messages with at least another gateway node indicating state information at least selected from the group of authentication and encryption keys, as well as mobile internet protocol registrations, and
the base stations is further configured to trigger a partial communication network re-entry of the plurality of mobile terminals in case the status of any one of the plurality of gateway nodes has changed according to a changed indication within two consecutively received base station report messages, wherein the partial communication network re-entry involves a gateway node selection for serving the plurality of mobile terminals, with a gateway node only being considered for selection if its currently indicated status is recovered, and wherein state information present at each of the gateway nodes which are not in failed status is utilized for the communication network re-entry.

12. The system according to claim 10, wherein the second apparatus further comprising:
a receiver configured to receive the peer status report message from the first gateway node;
a determiner configured to cause the sender sending a base station report message indicating the status of the first gateway node in case the status of the first gateway node has changed according to a changed indication within two consecutively received peer status report messages from the first gateway node or no peer status report message has been received from the first gateway node within a configured time period which indicates a failure status of the first gateway node, and wherein
the sender of the second gateway node is further configured to send the base station report message to the base station; and wherein
the base station further comprises a base station receiver configured to receive, by the second connector, a base station report message indicating a status of the first gateway node, wherein the status is either failed or recovered.

13. The system according to claim 12, wherein
the base stations further comprises a trigger unit configured to trigger a full communication network re-entry of a mobile terminal which is connected to it in case the status of the first gateway node has changed according to a changed indication within two consecutively received base station report messages, and
the full communication network re-entry involves a gateway node selection for serving each of the plurality of mobile terminals, with a gateway node only being considered for selection if its currently indicated status is recovered.

14. The system according to claim 13, wherein the trigger unit of said base station is further configured to trigger those mobile terminals out of the plurality of mobile terminals which are actively exchanging data in case of an indicated failed status of the first gateway node with a higher priority, and in case of an indicated recovered status of the first gateway node with lower priority.

15. A method, comprising:
providing an interface connectivity between communication networks by at least a first gateway node and a second gateway node, wherein each of the first gateway node and the second gateway node are active;
sending, by each of the first and second gateway nodes to the respective other gateway node, one or more peer status report messages indicating a status, wherein a failure of one of the first and second gateway nodes is determined based on an absence of at least one of the peer status report messages, the absence causing an indication to be sent to a base station to trigger a network reentry of one or more mobile terminals assigned to the failed gateway node associated with the absence; and
receiving periodically, by each of the first and second gateway nodes to the respective other gateway node, at least one of the one or more peer status report messages from the respective other gateway node to determine the status of the group of predetermined functions of the respective other gateway node.

16. The method according to claim 15, further comprising:
exchanging by each of the gateway nodes state information messages with at least another gateway node indicating state information at least selected from the group of authentication and encryption keys, as well as mobile internet protocol registrations, and
involving a gateway node selection by the partial communication network re-entry for serving the plurality of mobile terminals, with a gateway node only being considered for selection if its currently indicated status is recovered.

17. A method, comprising:
providing a first connector configured to be operably connected to a first gateway node;
providing a second connector configured to be operably connected to a second gateway node different from the first gateway node, wherein each of the first gateway node and the second gateway node are active, wherein the second gateway node includes a receiver configured to receive periodically one or more peer status report messages from the first gateway node to indicate a status of a group of predetermined functions of the first gateway node;
providing a third connector configured to be operably connected, over a radio interface, to a plurality of mobile terminals; and
receiving a base station report message indicating the status of the first gateway node, wherein the status is either failed or recovered, the status representative of whether there is a failure at the first gateway node, the reception of the base station report message triggering a network reentry of one or more of the plurality of mobile terminals assigned to the first gateway node.

18. The method according to claim 17, further comprising:
assigning the first or second gateway node upon communication network entry to each of the plurality of mobile terminals by the base station.

19. The method according to claim 17, further comprising:
triggering, by the base station, a full communication network re-entry of a mobile terminal of the plurality of mobile terminals in case the status of the first gateway node has changed according to a changed indication within two consecutively received base station report messages, and
involving a gateway node selection by the full communication network re-entry for serving each of the plurality of mobile terminals, wherein a gateway node is only considered for selection if its currently indicated status is recovered.

20. The method according to claim 19, wherein said triggering includes triggering those mobile terminals out of the plurality of mobile terminals which are actively exchanging data in case of an indicated failed status of the first gateway node with a higher priority, and in case of an indicated recovered status of the first gateway node with lower priority.

21. The method according to claim 17, further comprising:
triggering, by the base stations a full communication network re-entry of an active mobile terminal which is connected to it via the radio interface in case the status of the first gateway node has changed according to a changed indication within two consecutively received base station report messages, and
involving a gateway node selection by the full communication network re-entry for serving each active mobile terminal, wherein a gateway node is only considered for selection if its currently indicated status is recovered.

22. The method according to claim 17, further comprising
sending a base station report message to the base station indicating the status of said first gateway node, in case the status of said first gateway node has changed according to a changed indication within two consecutively received peer status report messages from said first gateway node or no peer status report message from said first gateway node has been received by the second gateway node within a configured time period which indicates a failure status of said first gateway node.

23. An apparatus, comprising:
interface means, at a gateway node, configured to provide an interface connectivity between communication networks,
connector means, at the gateway node, configured to be operably connected to another gateway node configured to provide an interface connectivity between communication networks and to a base station providing connectivity for a plurality of mobile terminals over a radio interface;
sender means, at the gateway node, configured to send to the another gateway node one or more first peer status report messages indicating a first status of a group of predetermined functions of the gateway node, wherein each of the gateway node and the another gateway node are active,
wherein the sender means is configured to send the one or more first peer status report messages to the another gateway node, wherein a failure the gateway node is determined based on an absence of the one or more second peer status report messages received from the another gateway node, the absence causing an indication to be sent to a base station to trigger a network reentry of one or more mobile terminals assigned to the another gateway node associated with the absence; and
a receiver means configured to receive periodically the one or more second peer status report messages from the another gateway node to indicate a second status of the group of predetermined functions of the another gateway node.

24. An apparatus, comprising
first connector means configured to be operably connected to a first gateway node;
second connector means configured to be operably connected to a second gateway node different from the first gateway node, wherein each of the first gateway node and the second gateway node are active, wherein the second gateway node includes a receiver configured to receive periodically one or more peer status report messages from the first gateway node to indicate a status of a group of predetermined functions of the first gateway node;
third connector means configured to be operably connected, over a radio interface, to a plurality of mobile terminals; and
receiver means configured to receive, by the second connector means, a base station report message indicating the status of the first gateway node, wherein the status is either failed or recovered, the status representative of whether there is a failure at the first gateway node, the reception of the base station report message triggering a network reentry of one or more of the plurality of mobile terminals assigned to the first gateway node.

25. A computer program product embodied on a non-transitory computer readable storage medium, the computer program configured to control a processor to perform operations comprising:
  providing an interface connectivity between communication networks by at least a first gateway node and a second gateway node, wherein each of the first gateway node and the second gateway node are active;
  sending, by each of the first and second gateway nodes to the respective other gateway node, one or more peer status report messages indicating a status, wherein a failure of one of the first and second gateway nodes is determined based on an absence of at least one of the peer status report messages, the absence causing an indication to be sent to a base station to trigger a network reentry of one or more mobile terminals assigned to the failed gateway node associated with the absence; and
  receiving periodically, by each of the first and second gateway nodes to the respective other gateway node, at least one of the one or more peer status report messages from the respective other gateway node to determine the status of the group of predetermined functions of the respective other gateway node.

26. A computer program product embodied on a non-transitory computer readable storage medium, the computer program configured to control a processor to perform a method, the method comprising:
  providing a first connector configured to be operably connected to a first gateway node;
  providing a second connector configured to be operably connected to a second gateway node different from the first gateway node, wherein each of the first gateway node and the second gateway node are active, wherein the second gateway node includes a receiver configured to receive periodically one or more peer status report messages from the first gateway to indicate a status of a group of predetermined functions of the first gateway node;
  providing a third connector configured to be operably connected, over a radio interface, to a plurality of mobile terminals; and
  receiving a base station report message indicating the status of the first gateway node, wherein the status is either failed or recovered, the status representative of whether there is a failure at the first gateway node, the reception of the base station report message triggering a network reentry of one or more of the plurality of mobile terminals assigned to the first gateway node.

* * * * *